UNITED STATES PATENT OFFICE.

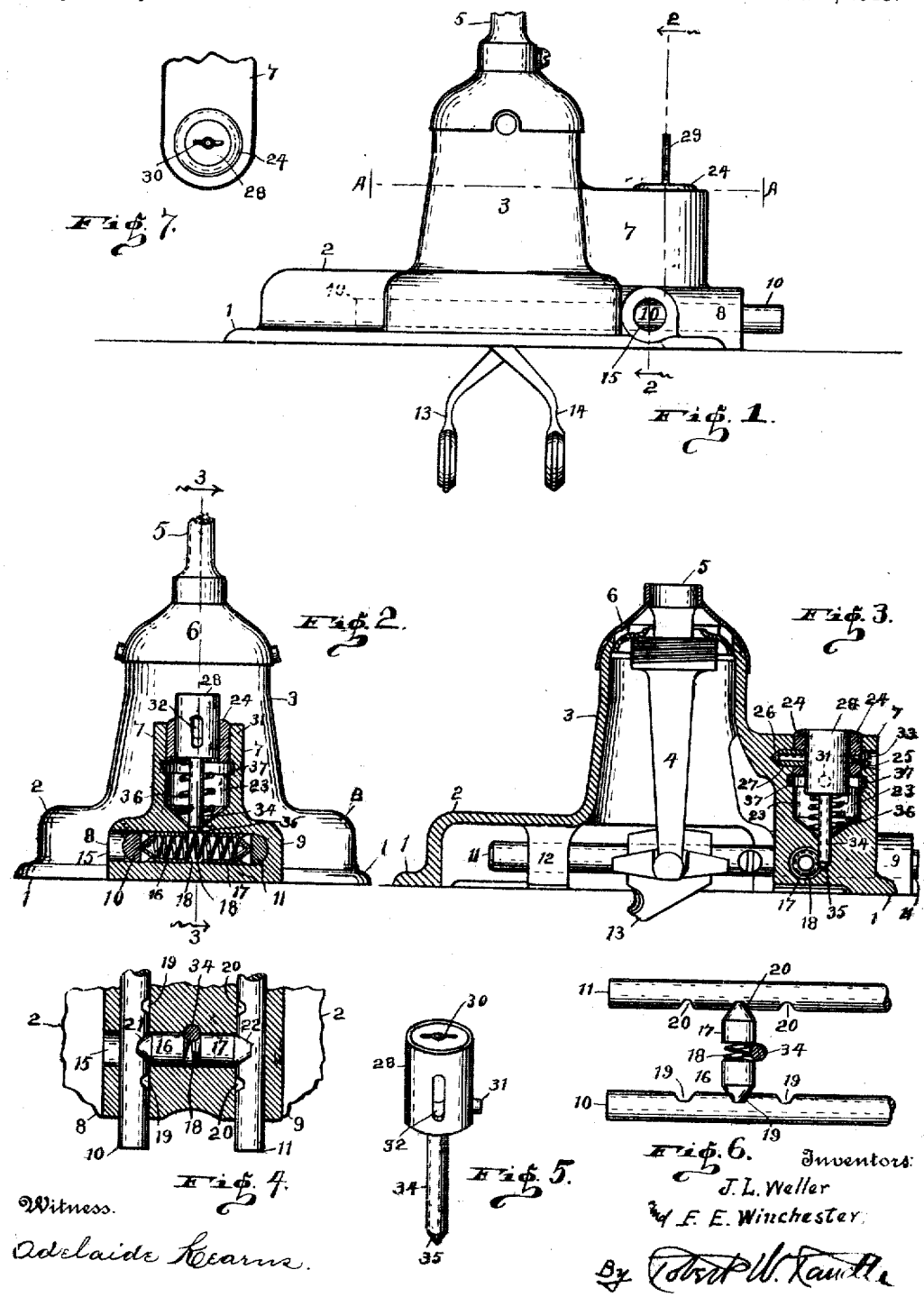

JOHN L. WELLER AND FRANKLIN EARL WINCHESTER, OF RICHMOND, INDIANA.

GEAR-SHIFTING LOCK.

1,296,026. Specification of Letters Patent. Patented Mar. 4, 1919.

Application filed October 25, 1918. Serial No. 259,638.

*To all whom it may concern:*

Be it known that we, JOHN L. WELLER and FRANKLIN EARL WINCHESTER, both citizens of the United States, residing in the city of Richmond, in the county of Wayne, State of Indiana, have invented certain new and useful Improvements in Gear-Shifting Locks for Automobiles or the like, of which the following is a full, clear, and accurate specification and exposition, the same being such as will enable others to make and use the same with precision.

Our present invention relates to locks, or locking means, which are especially applicable to automobiles or the like, and incorporates certain improvements in connection with that covered by our former Patent, No. 1,263,826, dated April 23, 1918.

The object of this invention, broadly stated, is to provide a combined interlock, locating lock, and transmission lock, for automobiles, wherein the mechanism will be simple in character, positive in action, strong and durable in construction, easily operated by an authorized person, and which can be manufactured and installed at a comparatively low price.

The specific objects of this invention are: to combine, with a gear shifting mechanism, interlocking means, locating locking means, and transmission locking means, also combining the same with each other, and with certain improvements over and in addition to that shown in our former patent above referred to.

By the word "interlock," as used in this instance, is meant the means for locking either one of the shifting rods, or their equivalents, from movement while the other is being moved or is in a position other than neutral. By the expression "locating lock" is meant the means whereby the operator can determine when either one of the shifting rods are in any one of their operative positions to which they may be shifted for operation, and also providing the means whereby the shifting rods will be locked, against inadvertent movement, in the position to which they have been shifted. By the expression "transmission lock" is meant the means for locking the shifting-rods, or other movable parts, against movement in either direction by an unauthorized person, whereby the gears will be secured from movement from the position in which they have been left, unless one has the proper key or combination thereto.

It is to be understood that in some instances the shifting rods may remain stationary, or entirely dispensed with, while the shifting forks are slidable on the rods or their equivalents, in which case our transmission lock may be employed with only slight variations, in order to lock the shifting forks direct against unauthorized movement in either direction.

It should be further stated that the interlocking means and the locating locking means are substantially the same mechanism in this instance, but only differently applied, the only difference being that the latter employs slightly different notches in the shifting rods, the particularly novel feature being that one mechanism is employed to attain two distinct results. Also the transmission lock is adapted to operate in connection with the interlock or the locating lock, in such manner as to cause them to act as part of the entire gear shifting locking means.

One way of carrying out the principles of our invention in a practical and a mechanical manner is shown in the accompanying drawings, in which—Figure 1 is a side elevation of the control and the cover for the transmission case, showing our invention in connection therewith. Fig. 2 is a vertical cross section, as taken through the invention on the line 2—2 of Fig. 1, but showing the transmission lock in unlocked position. Fig. 3 is a vertical central section, taken longitudinally as on the line 3—3 of Fig. 2, showing the transmission lock as in locked position. Fig. 4 is a detail horizontal section showing the interlocking and the transmission locking means. Fig. 5 is a perspective view of the transmission locking means. Fig. 6 is a plan view showing the means for locking the locating locking means. And Fig. 7 is a plan view of the upper end or face of the transmission locking means.

Similar indices denote like parts throughout the several views.

Our invention is applicable, with but slight variations, to all forms and makes of transmissions, and transmission operating means, but in this instance the transmission proper is located below the floor line A—A, with the face of the transmission lock even with the surface of the floor, and with the control lever extending upward thereabove for a considerable distance.

Referring now to the drawings in detail: Numeral 1 denotes the cover plate, or flange, for the transmission case. to which it is adapted to be bolted in the usual manner. Numeral 2 denotes the body of the cover, which is integral therewith, and projecting upward from the central portion of the body 2 is the housing 3, which is round in horizontal cross section, and its interior is formed hollow, with the lower portion 4 of the control lever operative universally therein, and with the upper or outer portion 5 of the control lever extending thereabove in the usual manner.

Numeral 6 denotes the dome-cap which covers the upper end of the housing 3, with the control lever extending through said cap and secured thereto, said cap being adapted to turn universally on the upper end of the housing 3. The central portion of the control lever is mounted for universal movements in the upper end of the housing 3.

Formed integral with the rear side of the housing 3, and with the top of the body 2, is the transmission-lock case 7, its face being flush with the floor-line A—A in most instances.

Also formed integral with the rear end portion of the cover 1, and with the body 2, and spaced equally on each side of the lock case 7, are the bearing projections 8 and 9, with parallel apertures formed horizontally and longitudinally therethrough for the respective shifting rods 10 and 11 to slide in horizontally.

Extending down into the forward central portion of the body 2, and integral therewith, are the bearings 12, in which the forward portions of the rods 10 and 11 may slide in. Secured on the central portions of the rods 10 and 11 are the respective shifting forks 13 and 14, with either one of which the lower end of the control lever may engage to shift the forks forward and backward whereby the transmission gears will be shifted in the usual manner.

All of said parts, except the case 7, are of ordinary construction, to which we make no claim, neither are we to be limited thereto.

In our former patent, above mentioned, the interlock was indicated as being located at the forward end of the device, but in this instance the interlock at the forward end is dispensed with, and the interlock is located at the rear end portion of the device and in connection with the transmission lock, and this new arrangement forms part of our invention and will now be explained in detail.

Formed horizontally through the bearing projection 8, and entering the aperture in the bearing projection 9, but not extending through the outer wall of the latter, is an aperture 15, round in cross section, in which the interlock and the locating locking cones are located. The aperture 15 is located on the same plane as are the rods 10 and 11, and it is at right angles thereto, Fig. 4.

*Locking members.*

Fitting slidably in the aperture 15 are the two hollow and pointed cones 16 and 17, the taper points thereof being appositely disposed with relation to each other, and with a helical spring 18 therebetween and having its ends seated in the hollows of the cones, whereby the cones are normally forced apart, but they are adapted to be forced together, thereby compressing the spring 18.

A plurality of locating notches, 19 and 20, are formed in the respective rods 10 and 11, while between the respective notches 19 and 20 are the deeper or interlocking notches 21 and 22, the same also being formed in the respective rods 10 and 11. The taper points of the respective cones 16 and 17 are, as shown in Fig. 4, located in the interlocking notches 21 and 22, respectively, but in Fig. 6 they are shown as being located in shallow or locating notches.

Extending down into and through the face of the case 7 is a comparatively large cylindrical chamber 23 which, in this instance, has a convergent bottom, through the center of which is a vertical aperture for the purpose hereinafter explained, which intersects the aperture 15, but it is slightly forward of the center thereof.

Located in and fitting the upper portion of the chamber 23 is the thimble 24. Said thimble is retained in place as follows: A horizontal hole 25 is bored near the top and in the center of the rear side of the case 7, and the tool by which the hole 25 is formed is projected through and across the center of the chamber 23 and then continued into the inner wall of the front side of said chamber, thereby forming the socket 26 to receive the detent or pintle 27, which latter is simply a short length of small pipe or rod, with its forward end adapted to be located in a corresponding aperture formed in one side of the thimble. It is evident that said detent may be inserted from the interior of the thimble from which it may be pressed into the socket 26, thereby preventing the thimble from being turned or removed, that is after the barrel is in position.

The barrel of the transmission lock is denoted by numeral 28, the interior of said barrel being of ordinary construction with which this invention is not concerned. A key 29 is provided for the barrel, the same being adapted to be inserted into the key-aperture 30 whereby the body of the key enters the interior of the barrel in order to draw in the plunger 31 whereby it will be flush with the periphery of the barrel. Said plunger 31 is normally pressed outward by spring means within the barrel. Formed in the side of the barrel is a vertical slot-cavity 32. Said barrel 28 is adapted to fit snugly in the collar 24, with its upper end or face flush with the upper end of the collar, at which time the plunger 31 will be projected out immediately below and engaging the lower end of the collar 26 and adapted to prevent the barrel from being moved upward until after the plunger has been drawn in by the key.

A screw 33 extends through the hole 25, with its shank threaded through the wall of the thimble 24, and with its point projecting into the slot-cavity 32, thereby limiting the movements of the barrel but permitting it to be moved up and down only within the limits of the length of the slot-cavity 32.

A stem or locking pin 34 is formed integral with the lower end of the barrel 28 and it projects down concentric therewith. The lower end of the stem 34 is pointed, as indicated at 35. Said stem extends down from the barrel through the chamber 23, with its lower portion slidably fitting in said aperture which connects the chamber 23 with the aperture 15, being offset forward with relation to the latter.

A helical spring 36 encircles the stem 34, with its upper end seated against the bottom of the barrel 28, and its lower end resting on the bottom of the chamber 23, and said spring is adapted to force the barrel 28 resiliently upward to its limit of movement.

The lower end of the stem 34 is adapted, when the barrel is downward to its limit, to be located between the inner ends of the cones 16 and 17 to retain them in spaced relations as shown.

Operation.

It should be observed that if the barrel 28 be upward to its limit, as in Fig. 2, that the control lever may be moved from neutral position, in which it is shown, to either one of the operative positions, that is to low, intermediate, high, or reverse. When the control lever is moved to the left and rearward then the rod 11 will be moved forward, thereby causing the fork 13 to move the gears into low gear. This movement will cause the cone 17 to move toward the cone 16, thereby preventing the cone 16 from moving out of the notch 21, and thereby interlocking the rod 10 until such time as the lever is brought to neutral position, that is until the rods 10 and 11 are in relative positions in which they are shown in Fig. 4. When the rod 11 is moved forward to low position then the point of the cone 17 will drop into the near notch 20, thereby forming a locating lock at that point for the rod 11, and still causing the cone 16 to act as an interlock for the rod 10.

Desiring next to shift to intermediate speed, the lever is returned to neutral position thereby causing the rods to assume the positions shown in Fig. 4, after which the lever may be moved to the right and forward, thereby causing the rod 10 to be moved rearward. This will cause the cone 16 to move toward the cone 17, thereby preventing the cone 17 from moving out of the notch 22 and thereby interlocking the rod 11 until such time as when the lever is again returned to neutral position. When the rod 11 is moved rearward to intermediate position then the point of the cone 16 will drop into the far notch 19, thereby forming a locating lock for the rod 10 when the gears are in intermediate position and still causing the cone 17 to act as an interlock for the rod 11.

Desiring now to move to high speed, the lever is again moved to neutral position thereby causing the cones to again assume the position shown in Fig. 4, then the lever may be moved to the right and rearward, thereby causing the rod 10 to move forward until the point of the cone 16 engages in the near notch 19, thereby forming a locating lock for the high gear position, and the other parts will act in the same manner as in the other positions mentioned.

For the reverse movement the lever is again brought to neutral and then moved to the left and forward, the parts operating as before, with the rod 11 moved rearward until the point of the cone 17 is seated in the far notch 20, thereby forming the locating lock for the rod 11 in reverse position.

From the above it will be seen that when the rods 10 and 11 are in neutral position that either one of them may be moved forward or backward, but one of them will always be locked in neutral position when the other one is in any position other than neutral, thereby providing the interlock. It should also be noticed that when one of the rods is shifted to one of the positions other than neutral that the point of the cone on that side will enter the notch for the position selected and will thereby act as the locating lock for that position.

When the lever is in neutral position, that is with the cones 16 and 17 in the larger notches, 21 and 22, then if the barrel 28 be pressed down flush with the collar 24, as in Fig. 3, it is evident that the stem 34 will be driven down between the cones thereby preventing either one of the rods 10 or 11 from being moved to either of the operation positions, and when the barrel is down to its limit the plunger 31 will engage under the collar 24, thereby placing the transmission lock in action which manifestly will prevent the gears from being placed in gear.

If it should be desired to arrange the device to employ the transmission lock to act in either one of the operative positions as well as in neutral then all of the notches in the rods 10 and 11 may be made of the same size, that is as locating notches, with the space between the cones such that the stem may enter between the cones when any two notches are in alinement with the cones, as is shown in Fig. 6.

When we refer, herein, to the rods 10 and 11 as being in neutral or in shifted position it is to be understood that we refer also to the forks 13 and 14 which are rigidly connected thereto, as said rods only act as guides for the forks, in fact the forks may be integral with the respective rods, or means other than said rods may be employed for guiding the forks, and the locking means may be applied thereto in lieu of the rods.

Attention is called to the fact that if the screw 33 be removed, when the barrel 28 is down to its limit, that the barrel may be rotated within the collar, but even then it cannot be moved upward, as the plunger will still be engaged under the collar, therefore the stem 34 could not be removed from between the cones.

But with the screw 33 removed, it is evident, that if the key 29 be turned to retrieve the plunger 31 that the barrel 28, and the stem 34 could be entirely removed from operative position.

When the machine to which the mechanism herein described is attached is in operative condition, then the barrel 28 and the stem 34 are upward to their limits, as in Fig. 2, retained in that position by the spring 36, at which time the key 29 is removed from the lock. Desiring now to lock the transmission, whereby the machine, or automobile can not be placed in gear, then one has only to press down the barrel 28 to its limit (which can be done by the foot of the driver, or by one's hand) thereby bringing it to the position shown in Fig. 3, whereby the plunger 31 will engage under the collar 24, and the stem 34 will be located between the cones 16 and 17, thereby holding them in the notches opposite thereto, and thereby absolutely preventing the transmission from being placed in gear. Desiring then to operate the machine one has only to insert the key 29 in the key-aperture 30 of the barrel, pressing the key down to its limit, and then giving a slight turn thereto, which will draw in the plunger 31, after which the spring 36 will force the barrel upward and thereby withdraw the stem from between the cones which will permit the gears to be shifted to any position desired in the usual manner.

It is to be understood that balls may be employed in place of the cones 16 and 17, similar to that shown in our former patent above referred to, or a combination of balls and cones, or other equivalents may be employed if preferred.

It is also to be understood that we are not to be limited to a key for operating the transmission lock, as a permutation or other locking means may be employed if so desired.

It is to be understood that the collar 24 may be dispensed with, the barrel 28 being then made of a size to fit the interior of the chamber 23, or the chamber may be made to fit the barrel, in which event a counterbored channel 37 may be formed around in the wall of the chamber 23 to receive the projecting portion of the plunger 31, said channel 37 being indicated in Fig. 3.

We also desire that it be understood that various changes and modifications may be made in the details of construction from that herein shown and described without departing from the spirit of this invention and without sacrificing any of the advantages thereof.

Having now fully shown and described our invention, what we claim and desire to secure by Letters Patent of the United States, is—

1. In combination with a transmission having a pair of shifting rods operative longitudinally therein parallel with each other with notches in their proximate faces, an extension having a cylindrical chamber therein which is disposed in vertical position, a lock-barrel fitting in said chamber and having a plunger adapted to engage inside said chamber to prevent the barrel from being moved upward when said plunger is engaged but permitting the barrel being rotated in the chamber while the plunger is engaged, means for manually drawing the plunger within the barrel, means for limiting the endwise movement of the barrel when the plunger is released, means for normally pressing the barrel outward to its limit of movement when said plunger is released, a pair of locking members located in an aperture intersecting the lower end of said chamber at right-angles thereto and also intersecting the apertures in which the shifting rods operate and at right-angles thereto, means for normally and resiliently forcing said locking members apart and into contact with the respective shifting rods, and a locking-pin extending down from said barrel and adapted to enter between said locking members when the locking members are in the respective notches of the shifting rods whereby said rods will be locked against endwise movements.

2. In combination with a transmission having a pair of shifting rods operative longitudinally therein parallel with each other, a single mechanism providing an interlock, locating lock, and transmission lock for said rods, said mechanism comprising a pair of oppositely disposed locking members operative horizontally and adapted to enter notches formed in the proximate sides of said rods, a spring having its ends seated between said locking members and normally forcing the locking members apart, a vertically operative locking-pin adapted to be inserted between the inner ends of said locking members when said locking members are located in said notches of the rods, a locking barrel located on the upper end of the locking-pin, means for normally forcing said barrel upward with the locking-pin out of the path of said locking members, means for locking said barrel at its downward limit of movement with the locking-pin between said locking members, and means for inclosing all of said parts with material which is integral with the transmission, all substantially as shown and described.

3. In combination with a case having a cylindrical chamber therein, a collar fitting the outer portion of said chamber, a lock barrel fitting in said collar and having a plunger adapted to engage with the inner end of the collar, means for retaining the collar in position which means is retained in place by the barrel in the collar, means for limiting the endwise movement of the barrel in the collar, and a spring for normally pressing the barrel outward to its limit of movement.

4. In combination with a transmission, a case having a cylindrical chamber therein, a lock-barrel fitting in said chamber and having a plunger adapted to engage inside said case to prevent the barrel from being moved upward when the plunger is engaged but permitting the barrel being rotated in the chamber while the plunger is engaged, means for limiting the endwise movement of the barrel when the plunger is released, means for normally pressing the barrel outward to its limit of movement, and means carried by the barrel for locking the transmission when the plunger is engaged.

In testimony whereof we have hereunto subscribed our names to this specification in the presence of two subscribing witnesses.

JOHN L. WELLER.
FRANKLIN EARL WINCHESTER.

Witnesses:
ROBT. W. RANDLE,
R. E. RANDLE.